United States Patent [19]

Ungs et al.

[11] Patent Number: 5,137,458
[45] Date of Patent: Aug. 11, 1992

[54] ELECTRODE PLACEMENT TRAINING SYSTEM

[75] Inventors: Mark T. Ungs, Redmond; Roert L. Hlinsky, Bellevue; John R. Loder, Redmond, all of Wash.

[73] Assignee: Physio-Control Corporation, Redmond, Wash.

[21] Appl. No.: 639,660

[22] Filed: Jan. 11, 1991

[51] Int. Cl.$^5$ ............................................. G09B 23/28
[52] U.S. Cl. ..................................... 434/262; 434/265
[58] Field of Search ................................. 434/265, 262

[56] References Cited

U.S. PATENT DOCUMENTS

| 3,323,068 | 5/1967 | Woods | 434/263 X |
| 4,021,933 | 5/1977 | Hughes | 434/262 |
| 4,932,879 | 6/1990 | Ingenito et al. | 434/265 X |

OTHER PUBLICATIONS

"Simulaids";p. 14, Jun. 1978.

Primary Examiner—Gene Mancene
Assistant Examiner—L. Thomas
Attorney, Agent, or Firm—Christensen, O'Connor, Johnson & Kindness

[57] ABSTRACT

A defibrillation training system (10) is disclosed for use in training individuals in the proper positioning of defibrillation electrodes on a patient. The system includes a pair of training electrodes (12), each of which includes a permanent magnet (40). The training electrodes are attached to a manikin (14) at two electrode placement sites (42 and 44) provided with arrays (46 and 48) of Hall-effect sensors. The magnetic field produced by the permanent magnet in each electrode is sensed by the corresponding array, allowing an electrode placement monitor (16), attached to the manikin, to determine the electrodes' positions. The placement monitor then determines whether any adjustments in the electrodes' positions are required and prompts the individual being trained accordingly.

19 Claims, 6 Drawing Sheets

ELECTRODE PLACEMENT TRAINING SYSTEM

FIELD OF THE INVENTION

This invention relates generally to the training of users of medical instruments employing electrodes and, more particularly, to the teaching of the proper placement of such electrodes on a patient.

BACKGROUND OF THE INVENTION

The emergency treatment of cardiac anomalies, involving defibrillation or monitoring of the electrical activity of a patient's heart may place a great deal of stress on medical personnel. For example, when a patient experiences cardiac arrest, the responding personnel are expected to quickly and accurately connect defibrillation electrodes to a defibrillator/monitor, apply the electrodes to the patient's chest area, and use the defibrillator/monitor to determine a further course of action. At times, the patient's life depends on the speed and skill with which these tasks are performed.

Reviewing the sequence of steps typically involved in this process in greater detail, cable leads included with the defibrillator/monitor are first attached to electrode pads. The cable leads are usually attached to the electrode pads before the pads are applied to the patient's chest to avoid the patient discomfort that might otherwise occur if the cable leads were pressed onto pads already attached to the patient.

Next, the electrode pads are applied to the patient's chest. As will be appreciated, the proper placement of the pads is an important factor in the successful achievement of defibrillation. In that regard, the pads should be positioned to ensure that the heart is in the current path defined between the pads. Also, the distance of the pads from the heart and their positions with respect to relatively nonconductive elements, such as the patient's sternum, should be selected to ensure that the impedance between the pads does not unduly limit the current applied to the heart.

One conventional electrode placement is referred to as an anterior/anterior arrangement. In this configuration, one pad is positioned lateral to the patient's upper sternum and below the patient's right clavicle. The second pad is placed on the patient's lower left chest, below and lateral to the cardiac apex. The anterior/anterior configuration is often used because of the ease with which the pads can generally be applied to the anterior portion of a patient's chest.

A second electrode placement is referred to as an anterior/posterior arrangement. In this configuration, an anterior pad is placed over the patient's precordium. The posterior pad is placed on the patient's back, behind the heart. The anterior/posterior configuration typically results in a relatively low interelectrode impedance and, hence, high current.

With the defibrillation pads applied to the patient's chest in one of these configurations, the defibrillator/monitor is then used to display and interpret the patient's electrocardiogram (ECG) signals and, if necessary, apply a pulse of energy to the patient's heart to achieve defibrillation.

Although the procedure of attaching electrode pads to the patient's chest and connecting the defibrillator/monitor cable leads to the electrode pads may seem simple and straightforward, in emergency situations errors may occur. Thus, it is advantageous to thoroughly and completely train attending emergency personnel in all aspects of this procedure. One method of training recognized to be effective is the repetitive simulation of emergency situations.

In that regard, prior art training procedures have been developed using ECG simulation signal generators. Typically, such a signal generator produces simulated ECG signals at two electrical connector posts provided on the generator. The trainee attaches the defibrillator/monitor cable leads to the connector posts and, using the defibrillator/monitor, evaluates the signal from the ECG simulation signal generator and determines a next course of action, such as defibrillation.

Although this basic procedure provides a trainee with practice in interpreting ECG signals, it does not allow the trainee to experience other aspects of an emergency situation. For example, no electrode pads are used in this type of training procedure. Thus, the trainee does not have an opportunity to practice the attachment of electrode pads to a patient.

Another approach to training involves the use of a manikin to simulate the patient. The ECG simulation signal generator is located inside the manikin and the electrical connector posts of the signal generator protrude from the chest of the manikin at positions corresponding to the desired electrode placement sites for actual patient use. The trainee then attaches electrode-shaped adhesive pads, provided with holes, to the chest area of the manikin by aligning the holes with the electrical posts.

Although the additional step of applying adhesive pads to the manikin makes the training exercise more realistic, the trainee does not have to identify the proper electrode placement sites. Rather, the proper placement of the electrode pads is prompted by the electrical connector posts on the manikin.

A more refined approach is described in U.S. patent application Ser. No. 462,615, still pending, assigned to Physio-Control Corporation, the assignee of the present application. The training system disclosed in that application includes a physically separated ECG signal generator and manikin. As a result, connector posts are not included on the manikin to assist the trainee in determining the proper electrode placement sites. Although the training procedure performed with this system realistically simulates an emergency setting, it does not allow the trainee to assess the appropriateness of the electrode placements used.

As noted above, however, the correct placement of the electrode pads on the patient is critical, given that the location of the pads greatly influences the effectiveness of the treatment. In view of this observation, it would be desirable to provide a method for training emergency medical personnel in the proper use of electrodes including, in particular, the proper placement of such electrodes.

SUMMARY OF THE INVENTION

In accordance with this invention, a training electrode assembly is disclosed for use with a medical instrument and a manikin. The assembly includes an electrode, attachable to the manikin. A connector is included for connecting the electrode to the medical instrument. Finally, a position indication device is coupled to the electrode for use in determining the location of the electrode relative to the manikin.

In accordance with another aspect of the invention, a system is disclosed for verifying the correct placement of an electrode on a patient. This system includes one electrode, including a position identification device for allowing the location of the electrode to be identified. A manikin, upon which the electrode may be placed, is included and has a position-sensing device for producing an output responsive to the position identification device on the electrode. A processor, coupled to the position-sensing device of the manikin, is included for receiving the output from the position-sensing device to determine the location of the electrode on the manikin.

In accordance with a further aspect of the invention, a method of teaching the proper placement of electrodes on a patient is disclosed. The method includes the step of applying a pair of training electrodes to a manikin. Next, the location of the training electrodes relative to the manikin is sensed. Finally, an output indicative of a desired change in the location of the training electrodes is produced.

BRIEF DESCRIPTION OF THE DRAWINGS

The invention will presently be described in greater detail, by way of example, with reference to the accompanying drawings, wherein:

FIG. 3 is a more detailed pictorial view of one of the training electrodes illustrated in FIG. 2;

DETAILED DESCRIPTION OF THE PREFERRED EMBODIMENT

Figure 1:
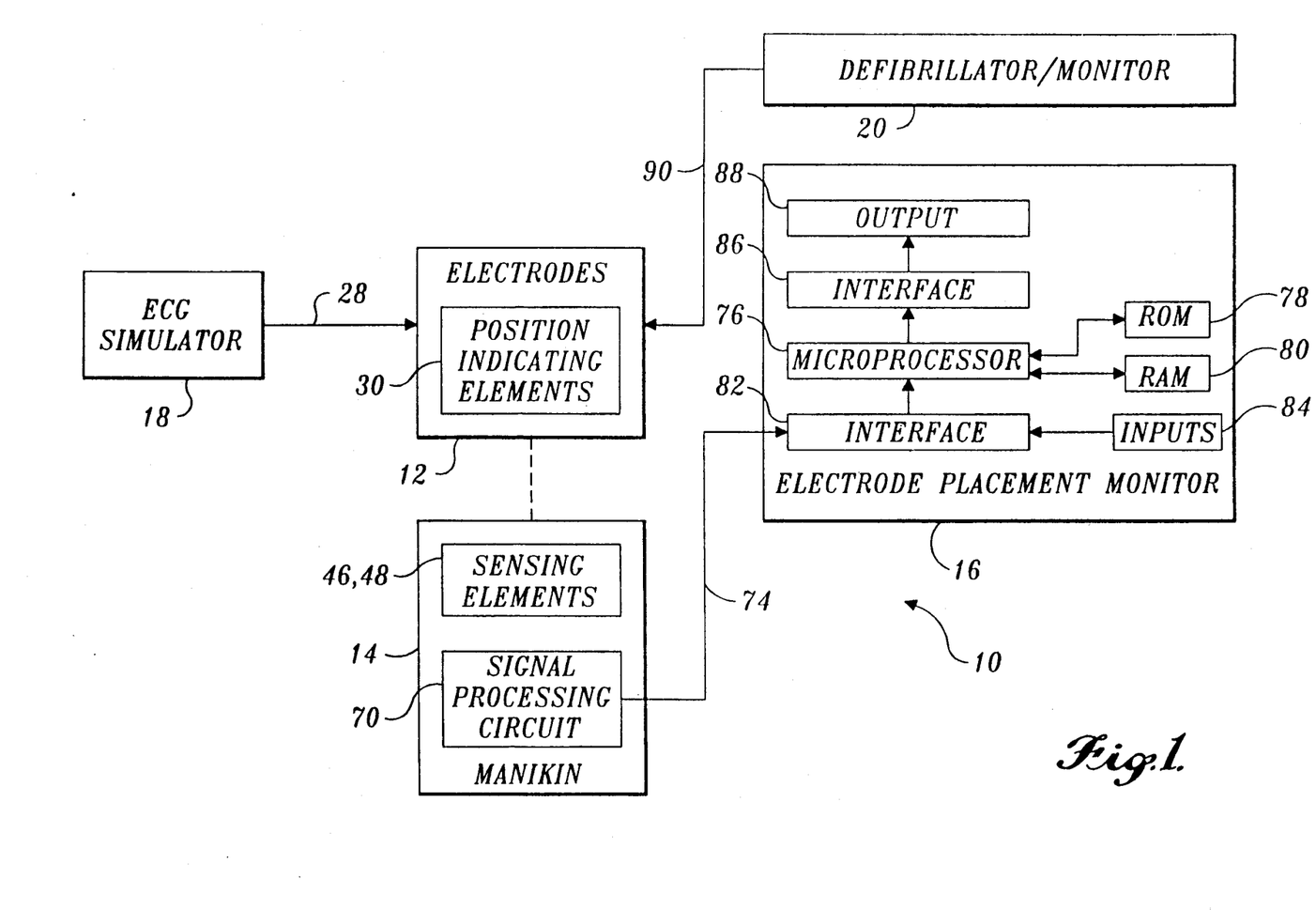
FIG. 1 is a block diagram of a system, constructed in accordance with the invention, that is used to train emergency personnel in the proper placement of defibrillation electrodes on a patient.

Referring now to FIG. 1, a defibrillation training system 10 is shown. The system 10 allows trainees to use defibrillation equipment in a nonemergency setting and provides them with feedback concerning the equipment's proper use. More particularly, through use of system 10, a trainee gains experience attaching defibrillation training electrodes to a "simulated patient" or manikin. The trainee also has an opportunity to evaluate simulated patient ECG signals and perform simulated defibrillations.

For the purpose of the ensuing discussion, however, the most important function of the system 10 is to teach the trainee the proper positioning of the training electrodes on the manikin. In that regard, as will be described in greater detail below, the system 10 gives the trainee an opportunity to first place the training electrodes on the manikin, based solely upon the trainee's evaluation of the manikin's physical appearance. Then, the system 10 evaluates the initial placement of the training electrodes and prompts the trainee concerning any adjustments in electrode placement required to properly locate the electrodes relative to the manikin.

As shown in FIG. 1, the defibrillation training system 10 includes a number of components that cooperatively perform these various functions. More particularly, as noted above, a pair of defibrillation training electrodes 12 are provided for attachment to a training manikin 14. The manikin 14 physically represents a defibrillation patient's chest and is electrically coupled to an electrode placement monitor 16 that determines the positions of the training electrodes 12, relative to manikin 14, and then prompts the user concerning appropriate adjustments in the electrodes' positions.

The defibrillation training system 10 also includes an ECG simulator 18 and defibrillator/monitor 20 that are electrically attached to the training electrodes 12. The ECG simulator 18 produces simulated ECG signals, representative of the electrical activity of a patient's heart under a variety of different physiological conditions. The defibrillator/monitor 20 allows the trainee to evaluate the simulated ECG signals and perform a simulated defibrillation, based upon the ECG signal evaluation.

Figure 2:
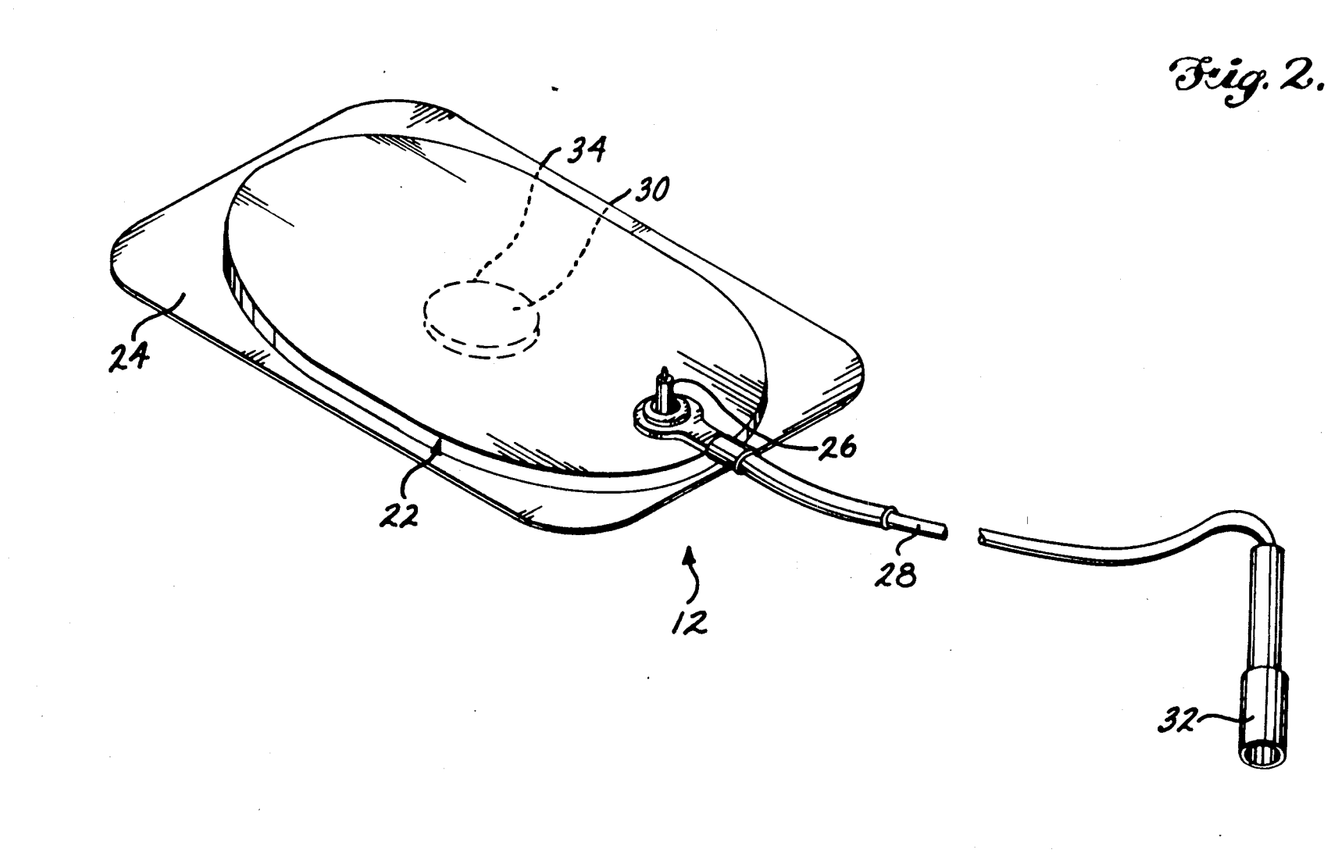
FIG. 2 is a pictorial view of one of two training electrodes employed in the system of FIG. 1.

Addressing these components of the defibrillation training system 10 individually, one of the training electrodes 12 is shown in greater detail in FIG. 2. As shown, the training electrode 12 includes an adhesive electrode pad assembly 22, release sheet 24, electrical connector post 26, electrical cable 28, and permanent magnet 30.

The adhesive pad assembly 22 forms the body of the training electrode 12 and includes several components that are not individually identified in FIG. 2. In that regard, the primary component of the pad assembly 22 is a roughly rectangular, foam substrate. One side of the foam substrate is designed to be applied to the manikin 14 and is provided with an adhesive layer. The other side of the foam substrate includes a plastic backing layer that increases the strength of the pad assembly.

The release sheet 24 is larger than the pad assembly 22 and is attached thereto by the adhesive layer. As will be appreciated, the release sheet 24 is removed from the pad assembly 22 to expose the adhesive layer, prior to use. Until that time, however, the release sheet 24 protects the adhesive layer, ensuring that the pad assembly 22 will readily adhere to the manikin 14, once the release sheet 24 is removed.

The electrical connector post 26 is mechanically attached to the substrate by, for example, crimping and projects substantially perpendicularly from the plastic backing layer. As will be described in greater detail below, the connector post 26 is constructed to engage an electrical cable coupled to the defibrillator/monitor 20. The connector post 26 is also secured to one end of the electrical cable 28. The other end of cable 28 is provided with a connector 32, constructed to engage the ECG simulator 18. As will be appreciated, the connector post 26, thus, provides an interface between the ECG simulator 18 and defibrillator/monitor 16.

For the purpose of the present discussion, the most important component of training electrode 12 is the permanent magnet 30. In that regard, the magnet 30 produces a magnetic field that is sensed by the manikin 14, as described in greater detail below, allowing the position of the electrode 12 on the manikin 14 to be determined by the placement monitor 16. The permanent magnet 30 is preferably a disc-shaped piece of a magnetic material and, in the preferred arrangement, magnet 30 is roughly one inch (2.54 centimeters) in diameter and one-eighth inch (0.32 centimeter) thick.

As shown in FIG. 2, the magnet 30 is received within a circular opening 34 in the foam substrate of the pad assembly 22, between the adhesive layer and the plastic backing layer. The opening 34 is substantially centered in the pad assembly 22.

Figure 3:
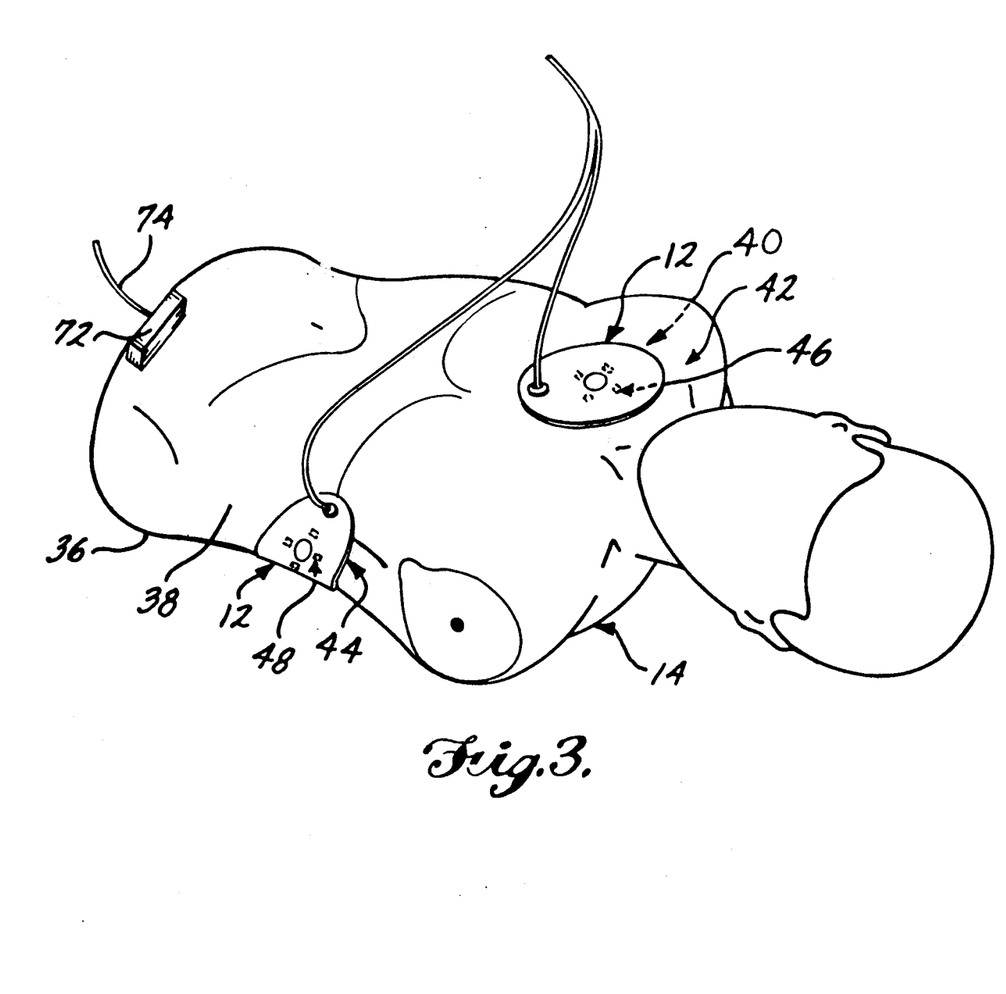
FIG. 3 is a pictorial view of a pair of the training electrodes, illustrated in FIG. 1, coupled to a manikin as part of a training procedure performed with the system of FIG. 1.

Discussing now a second component of the defibrillation training system 10 in greater detail, with reference to FIG. 3, the manikin 14 includes a generally rigid body 36, having an exterior 38 and interior 40. Although manikin 14 may be constructed to represent the entire body of a patient, the manikin 14 should at least represent the portion of a patient's trunk extending from the patient's neck to the patient's waist. The exterior 38 of the manikin 14 must be formed to have generally the same physical appearance as a patient's body, allowing a trainee to determine the appropriate placements of training electrodes 12 based upon that appearance.

In that regard, in the embodiment shown in FIG. 3, the body 36 of the manikin 14 has two electrode sites associated therewith for use in teaching the proper placement of the training electrodes 12 in an anterior-/anterior electrode arrangement. Specifically, the body 36 includes a first electrode site 42, upon which the right training electrode 12 is to be positioned, and a second electrode site 44, upon which the left training electrode 12 is to be positioned. The first electrode site 42 corresponds to a region on a patient that is lateral to the patient's upper sternum and below the patient's right clavicle. The second electrode site 44 corresponds to a region on a patient that is below, and lateral to, the patient's cardiac apex.

Attached to the interior 40 of the manikin 14 at sites 42 and 44 are two arrays 46 and 48, respectively, of Hall-effect sensors. Each Hall-effect sensor in arrays 46 and 48 is of conventional construction and develops an electric current in response to magnetic fields to which the sensor is exposed. As will be described in greater detail below, the arrays 46 and 48 produce outputs that are indicative of the positions of permanent magnets 30 at sites 42 and 44 and, hence, allow the positions of the electrodes 12 at sites 42 and 44 to be determined.

Figure 4:
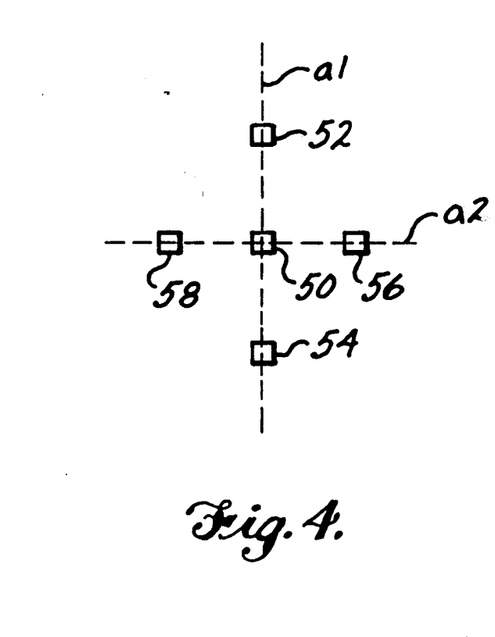
FIG. 4 is a more detailed pictorial view of a first section of the manikin represented in FIG. 1, illustrating a first electrode placement site and a plurality of electrode position sensors located inside the manikin at that site.
Figure 5:
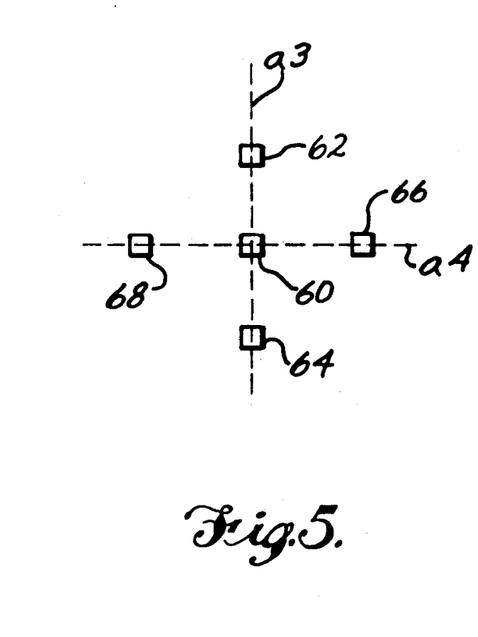
FIG. 5 is a more detailed pictorial view of a second section of the manikin represented in FIG. 1, illustrating a second electrode placement site and a plurality of electrode position sensors located inside the manikin at that site.

Reviewing the preferred arrangement of arrays 46 and 48 in greater detail, reference is made to FIGS. 4 and 5. As shown in FIG. 4, array 46 includes five separate Hall-effect sensors 50, 52, 54, 56, and 58. These sensors 50, 52, 54, 56, and 58 are aligned along two perpendicular axes a1 and a2, extending roughly parallel and perpendicular, respectively, to the sagittal line of manikin 14.

More particularly, sensor 50 is substantially centered with respect to site 42 and is located at the origin of axes a1 and a2. Sensors 52 and 54 are positioned along axis a1, with sensor 52 being spaced "above" sensor 50 and sensor 54 being spaced "below" sensor 50. Sensors 56 and 58 are positioned along axis a2, with sensor 56 being spaced to the manikin's left of sensor 50 (right of sensor 50 in FIG. 4) and sensor 58 being spaced to the manikin's right of sensor 50 (left of sensor 50 in FIG. 4).

In the arrangement shown, the centers of sensors 52 and 54 are separated from the center of sensor 50 by a distance of roughly three-fourths of one inch (1.9 centimeters). Similarly, the centers of sensors 56 and 58 are separated from the center of sensor 50 by a distance of roughly five-eighths of one inch (1.6 centimeters). Thus, as will be appreciated, the separation of sensors 52 and 54 along axis a1 is greater than the separation of sensors 56 and 58 along axis a2.

The second array 48 of Hall-effect sensors is shown in greater detail in FIG. 5. As shown, in the preferred arrangement, array 48 also includes five separate Hall-effect sensors 60, 62 64, 66, and 68. These sensors 60, 62, 64, 66, and 68 are aligned along two substantially perpendicular axes a3 and a4, extending roughly parallel and perpendicular, respectively, to the sagittal line of manikin 14.

More particularly, sensor 60 is substantially centered with respect to site 44 and is located at the origin of axes a3 and a4. Sensors 62 and 64 are positioned along axis a3, with sensor 62 being spaced "above" sensor 60 and sensor 64 being spaced "below" sensor 60. Sensors 66 and 68 are positioned along axis a4, with sensor 66 being spaced to the manikin's left of sensor 60 (right of sensor 60 in FIG. 5) and sensor 68 being spaced to the manikin's right of sensor 60 (left of sensor 60 in FIG. 5).

In the arrangement shown, the centers of sensors 62 and 64 are separated from the center of sensor 60 by a distance of roughly five-eighths of one inch (1.6 centimeters). Similarly, the centers of sensors 66 and 68 are separated from the center of sensor 60 by a distance of roughly three-fourths of one inch (1.9 centimeters). Thus, as will be appreciated, the separation of sensors 62 and 64 along axis a3 is less than the separation of sensors 66 and 68 along axis a4.

As indicated in FIG. 1, the manikin 14 also includes a signal-processing circuit 70 located, for example, inside the body 36 of manikin 14. The signal-processing circuit 70, whose constructional details will be readily understood by one of ordinary skill, is included to appropriately condition outputs generated by the sensor arrays 46 and 48 for receipt and analysis by the electrode placement monitor 16. For example, circuit 70 may include a signal amplifier that suitably amplifies the various sensor outputs of arrays 46 and 48 for subsequent processing.

In addition, the signal-processing circuit 70 preferably compares the analog outputs of the sensors in arrays 46 and 48 with a predetermined threshold level or levels as part of a signal conversion process. In that regard, as will be appreciated, the magnitudes of the analog outputs of the various sensors in arrays 46 and 48 are representative of the separation between the permanent magnets 30, included on the electrodes 12 positioned at sites 42 and 44, and the corresponding sensors in arrays 46 and 48. The analog output will exceed a given threshold level only if the distance between magnet 30 and the sensor that produced the output is less than some predetermined distance. Thus, based upon the threshold comparison performed, the processing circuit 70 converts each analog output into a digital form having one of two logic states, wherein a high logic output indicates that the electrode magnet 30 is within the predetermined distance from the particular sensor involved and a low logic output indicates that it is farther away.

The signal-processing circuit 70 also preferably includes a data management circuit that allows data from the arrays 46 and 48 to be serially transmitted to the placement monitor 16. Given the relatively large number of sensors included in arrays 46 and 48, serial transmission advantageously reduces the number of leads required to connect the manikin 14 and placement monitor 16.

In that regard, the manikin 14 also includes a connector block 72, shown in FIG. 3. The connector block 72 includes a plurality of connectors that allow the processing circuit 70 to be electrically connected to, for example, a cable set 74 extending to the placement monitor 16.

Addressing now the construction of the electrode placement monitor 16 in greater detail, reference is again made to FIG. 1. As shown, the placement monitor 16 includes a microprocessor 76, read-only memory (ROM) 78, random-access memory (RAM) 80, input interface 82, operator inputs 84, output interface 86, and visible and audible outputs 88. As will be described in greater detail below, the microprocessor 76 receives inputs from the manikin 14 and operator inputs 84, via interface 82, and processes them in accordance with programmed instructions stored in ROM 78 to provide a trainee with suitable prompts and information at outputs 88. Because the design of such a microprocessor-based system is well known in the art, the general construction and operation of the basic hardware components identified above are not discussed in greater detail.

The next component of the system 10 to be discussed is the ECG simulator 18. The ECG simulator 18 is of conventional design and is constructed to produce an output that simulates the ECG waveform generated by a patient's heart. In that regard, the ECG simulator 18 is preferably capable of producing waveforms suggestive of a variety of different heart conditions. The ECG simulator 18 can be constructed to allow waveform generation to occur randomly, or in response to specific inputs from an operator. The waveforms generated by the ECG simulator 18 are electrically coupled to the electrodes 12 by the electrical cables 28 of electrodes 12.

The last component of the system 10 to be reviewed is the defibrillator/monitor 20. The defibrillator/monitor 20 is electrically connected to the connector posts 26 of training electrodes 12 by a defibrillator cable set 90. Like the ECG simulator 18, the defibrillator/monitor 20 is of conventional design. In that regard, the defibrillator/monitor 20 includes a monitor section and a defibrillator section.

The monitor section of the defibrillator/monitor 20 allows the simulated ECG waveforms, generated by simulator 18, to be monitored by the trainee, for example, with the aid of a cathode-ray tube (CRT) display or printed chart. These waveforms are provided to the defibrillator/monitor 20 via the cables 28, connector posts 26, and cable set 90. The defibrillator section allows the trainee to generate, control, and discharge defibrillation pulses of electrical energy. Although the defibrillator/monitor 20 allows the trainee to simulate the administration of a defibrillation pulse to the manikin 14, the pulse is preferably discharged within the defibrillator/monitor 20, rather than being actually applied to the manikin 14.

Addressing now the operation of the system 10 described above, as previously noted, the system 10 is used as part of a training procedure that allows a trainee to learn and practice the proper use of electrodes 12 and defibrillator/monitor 20. By closely simulating the manner in which these components are actually used, the system 10 increases the trainee's readiness and ability to successfully use the equipment in an emergency.

The first, and most important for our purposes, step in the use of system 10 is the attachment of the training electrodes 12 to the manikin 14. In preparation for this step, the electrode placement monitor 16 is attached to the manikin 14 by cable set 74. The cables 28 provided on the electrodes 12 are also attached to the ECG simulator 18 and the defibrillator cable set 90 is attached to connector posts 26.

To begin the attachment process, the release sheet 24 of one electrode 12 is first removed from the adhesive electrode pad 22 and the electrode 12 is adhered to one of the two electrode sites 42 and 44. The release sheet 24 of the other electrode 12 is then removed and that electrode 12 is adhered to the other of the two sites 42 and 44. The sites 42 and 44 are not marked on the exterior 38 of the manikin 14 and the desired location of the electrodes 12 is determined by the trainee based solely upon the physical appearance of the manikin 14.

With the electrodes 12 attached and the necessary system connections having been previously made, the trainee is now ready to interact with the placement monitor 16 and defibrillator/monitor 20.

Figure 6:
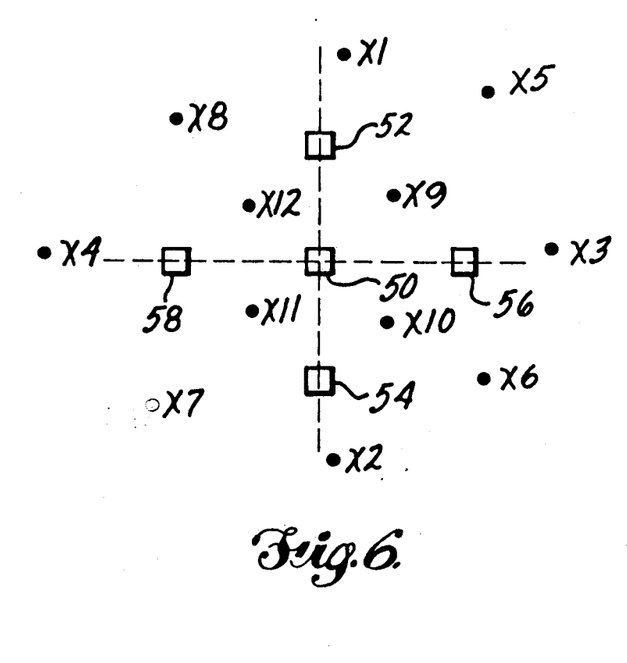
FIG. 6 is a graphic illustration of potential electrode positions at the first electrode placement site, relative to the plurality of sensors.
Figure 7:
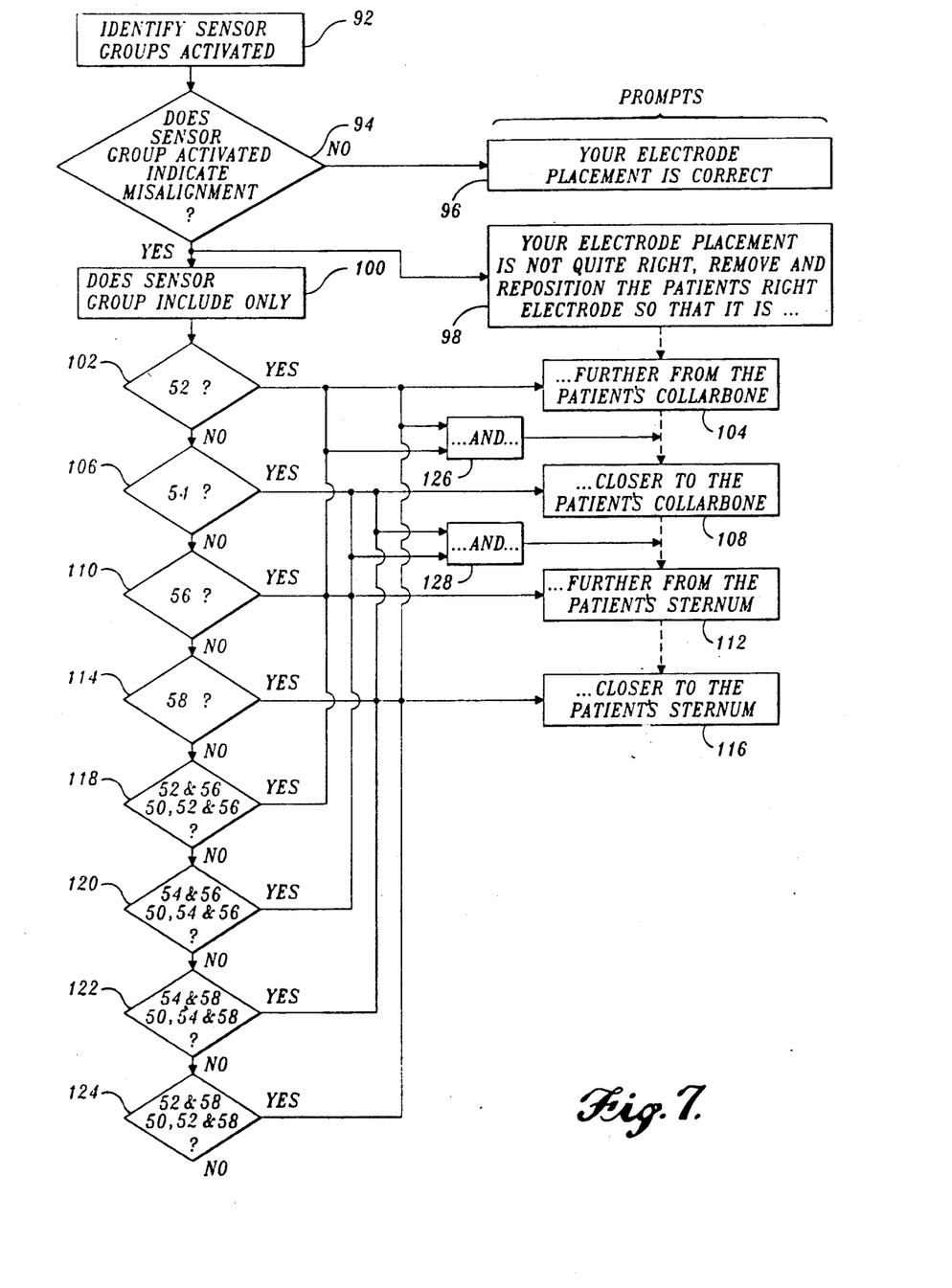
FIG. 7 is a flowchart illustrating the manner in which an electrode placement monitor, included in the system shown in FIG. 1, responds to the output of the various electrode position sensors included in the manikin to provide a trainee with guidance concerning proper electrode placement on the manikin.

Reviewing first the use and operation of the placement monitor 16, reference is made to FIGS. 6 and 7. As noted previously, the placement monitor 16 provides the trainee with feedback concerning the proper positioning of the electrodes 12 at the desired electrode sites 42 and 44. FIG. 6 illustrates the sensor array 46 located at the first site 42 and a number of potential electrode placements relative to array 46. FIG. 7 is a flowchart illustrating the operation of the monitor's microprocessor 76 in response to the electrode placements and the programmed instructions stored in ROM 78.

As represented at block 92 of FIG. 7, the microprocessor 76 first determines which of the various sensors 50, 52, 54, 56, and 58 in array 46 are "activated." In that regard, if the manikin's signal-processing circuit 70 converts the outputs of the sensors into a digital form having two logic levels, as described above, the microprocessor 76 considers the sensor to be activated when the processed output is at a high logic level. As will be recalled, the high output indicates that the electrode magnet 30 at site 42 is within a predetermined distance of the sensor that produced the output.

At block 92, microprocessor 76 then determines whether the particular sensors 50, 52, 54, 56, and 58 activated collectively form a group indicative of some misalignment of the electrode 12 at site 42. This "misalignment set," includes the following groups of activated sensors: (1) sensor 52 only; (2) sensor 54 only; (3) sensor 56 only; (4) sensor 58 only; (5) sensors 52 and 56 only; (6) sensors 54 and 56 only; (7) sensors 54 and 58 only; (8) sensors 52 and 58 only; (9) sensors 50, 52, and 56 only; (10) sensors 50, 54, and 56 only; (11) sensors 50, 54, and 58 only; and, (12) sensors 50, 52, and 58.

To illustrate why each of these groups is included in the misalignment set, reference is made to FIG. 6. First, assume that the center of the electrode magnet 30 is located at the point marked x1 and the thresholds employed by the manikin's processing circuit 70 cause only sensor 52 to be activated. The electrode 12 is clearly not centered at site 42 and, hence, the "sensor 52 only" group, (1), is appropriately included in the misalignment set. Similarly, if the electrode magnet 30 is centered at points x2, x3, or x4, the electrode 12 is not properly positioned and sensor 54, 56, or 58 only will be activated. Thus, groups (2), (3), and (4) are also properly included in the misalignment set.

Reviewing the other groups of the misalignments set, if the electrode magnet 30 is centered at point x5, x6, x7, or x8, the electrode 12 is not properly positioned and the activated sensors will be those of groups (5), (6), (7), or (8), respectively. Similarly, if the electrode magnet 30 is positioned at point x9, x10, x11, or x12, the electrode 12 is not properly positioned and the activated sensors will be those of groups (9), (10), (11), or (12), respectively.

The activation of groups of sensors not included in the misalignment set indicates that the electrode 12 is properly positioned at the site 42. In that regard, an "aligned set" of activated sensor groups includes (a) sensor 50 only; (b) sensors 52 and 54 only; (c) sensors 56 and 58 only; (d) sensors 52, 54, and 56 only; (e) sensors 54, 56, and 58 only; (f) sensors 52, 54, and 58 only; and (g) sensors 52, 56, and 58 only. If the activated sensors form one of these groups, the magnet 30 is either at, or near, the center of the site 42 corresponding to the position of sensor 50. In these situations, no adjustment of the electrode position is necessary or desirable. As will be appreciated, however, depending upon the thresholds used by processing circuit 70, it may be possible for the sensors included in certain of the sensor groups of the aligned set, such as (b) and (c), to be activated simultaneously.

Returning now to the flowchart of FIG. 7, as previously noted, the microprocessor 76 determines whether the activated sensor group falls within the misalignment set identified above at block 94. If the activated sensor group is not included in the misalignment set, the electrode 12 is properly aligned and the microprocessor 12 causes output 88 to generate the following audible prompt at block 96: YOUR ELECTRODE PLACEMENT IS CORRECT. If the activated sensors do form one of the groups in the misalignment set, however, microprocessor 76 determines that the electrode 12 is not properly aligned and proceeds to prompt the trainee concerning the adjustment(s) required.

More particularly, as indicated at block 98, the microprocessor 16 will cause the output 88 to generate the following introductory prompt: YOUR ELECTRODE PLACEMENT IS NOT QUITE RIGHT. REMOVE AND REPOSITION THE PATIENT'S RIGHT ELECTRODE SO THAT IT IS. The remainder of the prompt required to appropriately instruct the trainee is then generated in the following manner.

At block 100, the microprocessor 76 determines which of the various sensor groups included in the misalignment set is formed by the activated sensors. If only sensor 52 is activated (group (1)), the microprocessor 76 at decision block 102, proceeds to block 104, where microprocessor 76 causes output 88 to generate the following remainder of the prompt: FURTHER FROM THE PATIENT'S COLLARBONE. Alternatively, if the microprocessor 76 determines that one of the group (2), (3), or (4) sensors 54, 56, or 58 is activated, the operation of microprocessor 76 is directed by block 106, 110, or 114 to block 108, 112, or, 116, respectively.

In that regard, if only the group (2) sensor 54 is activated, the remainder of the prompt produced at block 108 is: CLOSER TO THE COLLARBONE. If only the group (3) sensor 56 is activated, the remainder of the prompt generated at block 112 is: FURTHER FROM THE PATIENT'S STERNUM. If only sensor 58 is activated, the remainder of the prompt generated at block 116 is: CLOSER TO THE PATIENT'S STERNUM.

Reviewing the remaining options for the completion of the initial prompt generated at block 98, if the microprocessor 76 determines that the activated sensors are those included in groups (5) and (9), (6) and (10), (7) and (11), or (8) and (12), respectively, of the misalignment set, decision block 118, 120, 122, or 124 directs the microprocessor 76 to combinations of prompt blocks 107, 108, 112, 116, 126, and 128. In that regard, if the activated sensors form group (5) or (9) and the microprocessor 76 causes the output 88 to complete the following prompt at blocks 104, 112, and 126: FURTHER FROM THE PATIENT'S COLLARBONE AND FURTHER FROM THE PATIENT'S STERNUM. Similarly, if the activated sensors form group (6) or (10), the remainder of the prompt generated by output 88 at blocks 108, 116, and 128 is: CLOSER TO THE PATIENT'S COLLARBONE AND FURTHER FROM THE PATIENT'S STERNUM. If the activated sensors form group (7) or (11), the remainder of the prompt generated by output 88 at blocks 108, 116, and 128 is: CLOSER TO THE PATIENT'S COLLARBONE AND CLOSER TO THE PATIENT'S STERNUM. Finally, if the activated sensors form group (8) or (12), the remainder of the prompt generated at blocks 104, 116, and 126, is: FURTHER FROM THE PATIENT'S COLLARBONE AND CLOSER TO THE PATIENT'S STERNUM.

Once the appropriate prompt, indicating the adjustment needed, has been generated in the preceding manner, the trainee removes the electrode 12 and repositions it at site 42. The foregoing process is then repeated, to determine whether the relocated electrode 12 is appropriately positioned. As will be appreciated, this process continues until the desired attachment is achieved. Though not described independently, the same process is performed to teach the proper location of the left electrode 12. With the electrodes 12 properly positioned on manikin 14, the trainee is then ready to evaluate the simulated ECG signals from simulator 18 and operate the defibrillator/monitor 20 accordingly.

As will be appreciated, only one embodiment of the various components of system 10 and their operation is described above. However, numerous alternative arrangements are contemplated. With regard to the training electrodes 12, while permanent magnets 30 offer the advantages of simplicity, reliability, and economy, other devices may be employed to cooperatively allow the positions of electrodes 12 relative to sites 42 and 44 to be determined. For example, alternative magnetic field sources, as well as electric field sources or optical sources, could be included to indicate the position of an electrode 12. Alternatively, a field source could be included on the manikin 14, with field sensors included on the electrodes 12. As an additional variation, a plurality of sources or sensors could be included on each electrode 12 for cooperation with a single source or sensor at each site 42 and 44.

The manikin 14 can likewise be altered in numerous ways. For example, in addition to those changes suggested above, the sensor arrays 46 and 48 could employ other magnetic or electric field-sensitive components in place of the Hall-effect sensors. Further, the number of sensors included in each array 46 and 48 could be varied, along with the pattern of the sensors, to alter the sensitivity of the array to the position of permanent magnet 30.

In that regard, as will be readily appreciated from a comparison of FIGS. 4 and 5, the separation of sensors 52 and 54 along axis a1 of array 46 is greater than that of sensors 56 and 58 along axis a2. The separation of sensors 62 and 64 along axis a3 of array 48 is similarly greater than that of sensors 66 and 68 along axis a4. With a single threshold voltage employed by the manikin's processing circuit 70, a high sensor output indicates that the magnet 30 is within a single predetermined distance of the sensor. Because the sensor separation along axis a1 is greater than that along axis a2, a small separation of magnet 30 from sensor 50 is more likely to cause sensors 56 and 58 to produce an output than it is to cause sensors 52 and 54 to produce an output.

As a result, the array 46 is more sensitive to variations in an electrode's position relative to axis a2 than it is to variations relative to axis a1. Array 48, on the other hand, is more sensitive to variations along axis a3 than it is to variations relative to axis a4. This irregular sensitivity is believed to be desirable in teaching the appropriate positioning of electrodes 12 for anterior/anterior placement. As will be appreciated, as an alternative to varying the layout of the various sensors included in the arrays 46 and 48, the number and sensitivity of the sensors, as well as the threshold voltages employed by the processing circuit 70 of manikin 14 can be altered to adjust the sensitivity.

Another important variation contemplated for the manikin 14 is the inclusion of other electrode placement sites corresponding, for example, to those sites to be used in an anterior/posterior electrode configuration. In this arrangement, one site corresponds to a region over a patient's precordium and the other site corresponds to a region on the patient's back, behind the heart. The number and arrangement of sensors included at such sites may be varied to account for placement tolerances deemed pertinent for the ..ectrode configuration involved. As will be appreciated, the sites may be added to the manikin 14 in addition to the sites 42 and 44 discussed above, or may be included in their place.

With regard to the placement monitor 16, as will be appreciated, the response of the microprocessor 76 to the various outputs from the sensor arrays 46 and 48 depicted in FIG. 7 is just one of many potential approaches that can be adopted. For example, the microprocessor 76 could simply generate a PLACEMENT ERROR prompt each time the group of activated sensors is within the misalignment set, leaving the trainee to make his or her own evaluation concerning the positional adjustment required. Further, the format in which the various prompts are given could be altered, allowing them to be, for example, displayed or printed out. In addition, the microprocessor 74 could be programmed to analyze the outputs of arrays 46 and 48 to compute the positions of electrodes 12 relative to coordinate systems defined by axes a1 and a2 and axes a3 and a4 and have those positions visually displayed by outputs 88.

In addition, the misalignment set of activated sensors used by the microprocessor 76 in evaluating the necessary adjustments in the electrodes's positions can be varied as desired. Further, if processing circuit 70 converted the analog outputs from the arrays 46 and 48 into digital representations of the full sensor signal, rather than a two-level logic state, the microprocessor 76 could perform more elaborate comparisons of the sensor outputs to more precisely determine the electrodes' locations and the adjustments in electrode positions required.

Those skilled in the art will recognize that the embodiments of the invention disclosed herein are exemplary in nature and that various changes can be made therein, without departing from the scope and the spirit of the invention. For example, the system 10 could be used to teach the proper location of ECG monitoring electrodes. Because of the above and numerous other variations and modifications that will occur to those skilled in the art, the following claims should not be limited to those embodiments illustrated and discussed herein.

The embodiments of the invention in which an exclusive property or privilege is claimed are defined as follows:

1. A system for verifying the correct placement of an electrode on a patient, comprising:
   at least one electrode, including position identification means for allowing the location of said electrode to be identified;
   a manikin, upon which said electrode may be placed, including position-sensing means for producing an output responsive to said position identification means; and
   processing means, coupled to said position-sensing means, for receiving the output from said position-sensing means to determine the location of said electrode on said manikin.

2. The system of claim 1, wherein said position identification means comprises a magnetic field source for producing a magnetic field and wherein said position-sensing means comprises a magnetic field sensor for producing an output in response to said magnetic field.

3. The system of claim 2, wherein said magnetic field source comprises a permanent magnet attached to the electrode.

4. The system of claim 3, wherein said magnetic field sensor comprises a Hall-effect sensor.

5. The system of claim 2, wherein the patient includes a first site on the right side of the chest, lateral to the upper sternum and below the right clavicle, and a second site on the lower left side of the chest, below and lateral to the cardiac apex, and has a sagittal plane defined with respect thereto, and wherein said manikin includes a first desired electrode site corresponding to the first site on the patient, and a second desired electrode site corresponding to the second site on the patient, said magnetic field sensor further comprising a plurality of magnetic field sensors arrayed in first and second groups adjacent said first and second electrode sites.

6. The system of claim 5, wherein said first group of magnetic field sensors is arrayed in a pattern having a major axis and a minor axis, said major axis extending substantially parallel to the sagittal plane and said minor axis extending roughly perpendicular to the sagittal plane and wherein said second group of magnetic field sensors is also arrayed in a pattern having a major axis and a minor axis, said major axis extending roughly perpendicular to the sagittal plane and said minor axis extending substantially parallel to the sagittal plane.

7. The system of claim 1, wherein said processing means produces an output indicative of the location of said electrode on said manikin.

8. The system of claim 7, wherein said output indicative of the location of said electrode on said manikin comprises an audible prompt indicating an appropriate adjustment in the location of said electrode on said manikin.

9. The system of claim 7, wherein said output indicative of the location of said electrode on said manikin comprises a visual display indicating an appropriate adjustment in the location of said electrode on said manikin.

10. A training electrode assembly, for use with a medical instrument and a manikin, comprising:
    an electrode, attachable to the manikin;
    connection means for connecting said electrode to said medical instrument; and
    position indication means, coupled to said electrode, for use in determining the location of said electrode relative to the manikin.

11. The training electrode assembly of claim 10, wherein said position indication means comprises a magnetic field source.

12. The training electrode of claim 11, wherein said magnetic field source comprises a permanent magnet.

13. The training electrode of claim 10, wherein said position indication means comprises sensing means for sensing the position of said training electrode relative to said manikin.

14. A defibrillation training manikin, for use in teaching the proper placement of training electrodes on a patient at a first location, on the right chest lateral to the upper sternum and below the right clavicle, and a second location, on the lower left chest, below and lateral to the cardiac apex, said manikin comprising:
    a body including a first region, representative of said first location on said patient, and a second region, representative of said second location on said patient; and
    position indication means, coupled to said body of said manikin, for use in determining the location of electrodes relative to said first and second regions on said body.

15. The manikin of claim 14, wherein said position indication means comprises sensors, positioned at said first and second regions, for sensing the location of the electrodes relative to said first and second regions.

16. The manikin of claim 15, wherein said position indication means comprises first and second arrays of sensors positioned at said first and second regions.

17. The manikin of claim 16, wherein the patient has a sagittal plane defined with respect thereto and wherein said first array of sensors has a major axis, extending substantially parallel to the plane, and a minor axis, extending roughly perpendicular to the plane, said second array of sensors also having a major axis, extending roughly perpendicular to the plane, and a minor axis, extending substantially parallel to the plane.

18. A monitor for use in teaching the proper locations of electrodes on a defibrillation training manikin, said processor comprising:
    determination means for determining the actual locations of the electrodes on the manikin;
    comparison means for comparing the actual locations of the electrodes with the proper locations of the electrodes; and
    output means for producing an output representative of a change in the actual locations of the electrodes required to match the actual locations with the proper locations.

19. A method of teaching the proper placement of defibrillation electrodes on a patient, comprising the steps of:
    applying a pair of training electrodes to a manikin;
    sensing the location of said training electrodes relative to said manikin; and
    producing an output indicative of a desired change in the locations of said training electrodes.

* * * * *

UNITED STATES PATENT AND TRADEMARK OFFICE
CERTIFICATE OF CORRECTION

PATENT NO. : 5,137,458
DATED : August 11, 1992
INVENTOR(S) : M.T. Ungs et al.

It is certified that error appears in the above-identified patent and that said Letters Patent is hereby corrected as shown below:

| COLUMN | LINE | |
|---|---|---|
| 6 | 15 | "62 64" should read --62, 64--; |
| 9 | 30 | after "may" insert --not--; |
| 10 | 25 | "116" should read --112--; |

Title page, item [75], change "Roert" to read --Robert-- and item
[56], ("U.S. Patent  4th Ref.    add --4,828,501  5/1989  Ingenito et al.--.
Documents")

Signed and Sealed this

Fourteenth Day of September, 1993

Attest:

BRUCE LEHMAN

*Attesting Officer*     *Commissioner of Patents and Trademarks*